US006257897B1

(12) United States Patent
Kubota

(10) Patent No.: US 6,257,897 B1
(45) Date of Patent: Jul. 10, 2001

(54) WIRING HARNESS DEVICE FOR INSTRUMENT PANELS

(75) Inventor: Minoru Kubota, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/547,405

(22) Filed: Apr. 11, 2000

(30) Foreign Application Priority Data

Apr. 13, 1999 (JP) ................................................. 11-104853

(51) Int. Cl.[7] .................................................. H01R 33/00
(52) U.S. Cl. .......................................................... 439/34
(58) Field of Search .............................. 307/10.1; 315/82; 340/425.5; 361/647, 690; 439/248, 34, 404, 397; 124/72 A

(56) References Cited

U.S. PATENT DOCUMENTS

| | | | |
|---|---|---|---|
| 5,442,518 | * | 8/1995 | Beam ..................................... 361/690 |
| 5,681,180 | * | 10/1997 | Rodrigues ............................. 439/404 |
| 5,712,764 | * | 1/1998 | Baker et al. ........................... 361/690 |
| 5,715,140 | * | 2/1998 | Sinkunas et al. ..................... 361/690 |
| 5,754,398 | * | 5/1998 | Glovatsky et al. ................... 361/690 |
| 5,833,486 | * | 11/1998 | Shinozaki ............................. 439/404 |
| 5,856,908 | * | 1/1999 | Takiguchi et al. ................... 361/690 |
| 5,883,777 | * | 3/1999 | Nishitani et al. .................... 361/647 |
| 6,059,601 | * | 5/2000 | Hirai et al. ........................... 439/405 |
| 6,062,888 | * | 5/2000 | Takiguchi ............................. 439/248 |
| 6,095,272 | * | 8/2000 | Takiguchi et al. ..................... 180/90 |
| 6,106,303 | * | 8/2000 | Wojewnik .............................. 439/34 |

FOREIGN PATENT DOCUMENTS 9-306608    11/1997   (JP) .

* cited by examiner

*Primary Examiner*—Tulsidas Patel
*Assistant Examiner*—Charles J Peschel
(74) *Attorney, Agent, or Firm*—Armstrong, Westerman, Hattori, McLeland & Naughton, LLP

(57) ABSTRACT

A wiring harness device for instrument panels consists of an electrical component unit having a first connector; an instrument panel having a mount portion for the component unit, which mount opening is provided with a connector insertion opening; an air duct which has wires laid thereon and which is assembled to the instrument panel; and a support means which extends in a cantilever manner from the air duct and supports a second connector thereon. The wires extend on the support means to the second connector. The second connector is movable relative to the air duct and easily mountable in the connector insertion opening for mating with the first connector. The positional deviation of the second connector relative to the connector insertion opening is remedied.

9 Claims, 7 Drawing Sheets

WIRING HARNESS DEVICE FOR INSTRUMENT PANELS

BACKGROUND OF THE INVENTION

1. Field of the Invention

This invention relates to a wiring harness device for vehicular instrument panels and, more particularly, to a wiring harness device which gives flexibility in positioning a unit-awaiting connector (connector kept in place for mating with a unit side connector) so as to facilitate assembling together an instrument panel and an air duct, connecting an electrical component unit to an instrument panel harness, and assembling the electrical component unit to the instrument panel.

2. Description of the Related Art

The present applicant has proposed in Japanese Patent Application No. 8-121999 a wiring harness device for instrument panels as shown in FIGS. 9 to 12 for making an improvement in connecting an electrical component unit to an instrument panel harness at the instrument panel of an automobile.

FIG. 9 is an exploded perspective view of this wiring harness device; FIG. 10 is a perspective view of an air duct and an instrument panel harness as in FIG. 10; FIG. 11 is an enlarged view of a connector holder provided on the air duct; and FIG. 12 is a sectional view of a unit-awaiting connector mounted in the connector holder.

FIG. 9, denoted 111, 112 are a center cluster unit and a meter unit, respectively, as electrical component units. Each electrical component unit 111, 112 has a not-shown connector projecting at the back for electrical connection to a later-described unit-awaiting connector 140B of an instrument panel harness 140.

Denoted 120 is a large resin molded item of an instrument panel which is provided at the center and the right side on the drawing with mount portions 121, 122 for the electrical component units 111, 112 and at the left and right ends with air outlets 123, 124 with a flow rate adjusting fin for an air conditioner.

Denoted 130 is an air duct which is also a large resin molded item, and which is assembled to the instrument panel 120. As shown in FIGS. 10 to 12, the air duct 130 is integrally formed, at its portions corresponding to the mount portions 121, 122 of the instrument panel 120, with a frame-like connector holder 130A for holding therein the related unit-awaiting connector 140B of the instrument panel harness 140.

The connector holder 130A, as best seen in FIGS. 11 and 12, has an inwardly stepped front wall and a connector mount opening 131 provided at the center of the front wall. Those parts of the front wall which laterally define the mount opening 131 are provided at their lower ends with an engagement claw 132 for holding the unit-awaiting connector 140B.

On its upper wall with a circumferential flange, the connector holder 130A has bosses 133 that fit in corresponding holes 125 provided on the underside of the instrument panel 120. The air duct 130 is provided at the front with a harness placement groove 134.

As shown in FIG. 9, the instrument panel harness 140 consists of a flexible printed circuit board 140A with each end thereof, as shown in FIGS. 11 and 12, bent back and mounted in a housing 141 to provide the unit-awaiting connector 140B for connecting to the electrical component unit 111, 112. The housing 141 of the connector 140B has a total of six integral spring pieces 142 at its upper, lower, left and right sides.

Each spring piece 142, when the unit-awaiting connector 140B is mounted in the connector mount opening 131, resiliently contacts the innermost wall surface of the connector holder 130A to support the connector 140B in a vertically and horizontally movable manner.

In the wiring harness device as described above, the instrument panel harness 140 is first laid in the harness placement groove 134 on the air duct 130, and the air duct is then assembled to the instrument panel 120.

Thereafter, the electrical component unit 111, 112 is mounted in the mount portion 121, 122 of the instrument panel 120, so that the connector on the unit's part mates with the unit-awaiting connector 140B properly positioned by the connector holder 130A of the air duct 130.

If in this case a dimensional error exists in the large resin molded item of the air duct 130, with the result that the connector holder 130A is found slightly deviated from position, the unit-awaiting connector 140B, owing to the spring pieces 142, moves vertically and horizontally during its coupling with the unit side connector to absorb and remedy the positional deviation.

With the wiring harness device as mentioned above, however, because the positional deviation of the connector holder 130A is remedied only through the movement of the connector 140B inside the connector holder, there is a fear that, if the dimensional error of the air duct 130 and thus the positional deviation of the connector holder 130A are large, such positional error will not be remedied only through the movement of the connector 140B.

Thus, with the air duct 130 with a dimensional error, difficulty has been encountered in assembling together the instrument panel 120 and the air duct 130, connecting the electrical component unit 111, 112 to the instrument panel harness 140 and assembling the electrical component unit 111, 112 to the instrument panel 120, and the need for an improvement in positioning the unit-awaiting connector 140B accurately has arisen.

Further, because the air duct 130 and the instrument panel harness 140 are provided separately from each other, they need to be assembled together on an automobile assembly line, requiring not only many man-hours, but also additional exterior components such as wire protectors, tapes, clamps and the like for protecting the instrument panel harness 140 before and after its mounting in position.

SUMMARY OF THE INVENTION

This invention has been accomplished to overcome the above drawbacks and one of its objects is to provide a wiring harness device for instrument panels which improves the flexibility in positioning a unit-awaiting connector so as to facilitate assembling together an instrument panel and an air duct, connecting an electrical component unit to an instrument panel harness, and assembling the electrical component unit to the instrument panel.

It is another object of this invention to provide a wiring harness device for instrument panels which reduces the manhours required at an automobile assembly line for assembling an instrument panel harness, and which reduces the exterior components such as wire protectors and the like.

In order to attain the objects, according to this invention, there is provided a wiring harness device for instrument panels which comprises: an electrical component unit having a first connector; an instrument panel having a mount portion for the electrical component unit and a connector insertion opening formed in a wall thereof defining the mount portion through which a second connector mates with the first connector; an air duct having a wire placement groove on a surface thereof, which is assembled to the instrument panel; and instrument panel wires fixedly laid in the wire placement groove on the air duct, wherein the air duct has a support means which supports the second connector on a front end thereof, and the instrument panel wires have a portion extending on the support means to the second connector, the support means extending in a cantilever manner such that the second connector is movable relative to the air duct and easily mountable in the connector insertion opening for mating with the first connector when the electrical component unit is received in the mount portion of the instrument panel.

In the wiring harness device of the above construction, when the air duct is assembled to the instrument panel, the second connector is placed in the connector insertion opening provided at the mount portion of the instrument panel. The second connector is thus positioned in opposition to the first connector provided on the electrical component unit which is later installed in the mount portion of the instrument panel, leading to an easy registration of the second connector with the first connector.

If there exists a large dimensional error in the large resin molded item of the instrument panel or the air duct, the second connector, due to the flexible support means, is movable relative to the air duct, thereby making it possible to absorb and remedy the positional deviation of the second connector relative to the connector insertion opening to a great extent and place the second connector in position for insertion into the connector insertion opening.

Further, because the positional deviation of the second connector can be remedied to a great extent, it is facilitated to assemble together the instrument panel and the air duct, connect the electrical component unit to instrument panel wires, and assemble the electrical component unit to the instrument panel.

Preferably, the support means comprises a plurality of support plates linked end-to-end to one another, and the second connector is located on a foremost one of the support plates.

Preferably, the support means comprises a first support plate projecting integrally from the air duct, a second support plate linked end-to-end through a hinge to the first support plate, and a third support plate linked end-to-end through a hinge to the second support plate, and the second connector is located on the third support plate.

In the wiring harness device as mentioned above, the third support plate and thus the second connector are displaceable at least in two steps, through the hinge linking together the first and second support plates and through the hinge linking together the second and third support plates. Consequently, an improved flexibility is obtained in positioning the second connector.

Preferably, the instrument panel wires are fixed in the wire placement groove on the air duct by means of a locking device fitted in the wire placement groove.

The instrument panel wires can be easily fixed in and removed from the wire placement groove through attachment and detachment of the locking device.

Advantageously, the locking device has corrugations which fit on the instrument panel wires laid in the wire placement groove.

Advantageously, the wire placement groove formed on the air duct has a branch groove extending perpendicularly therefrom to guide the portion of the instrument panel wires to the support means.

The wire placement groove provided with such branch groove enables not only the trunk portion, but also a branch portion of the instrument panel wires to be automatically laid on the air duct such that almost all parts of the wires are confined in the grooves, leading to an improved one-piece design of the air duct and the wires.

Preferably, the second connector comprises the foremost support plate, a row of terminal placement grooves formed on one surface of the foremost support plate, each provided with a throughhole on a bottom thereof which communicates to an opposite surface of the foremost support plate, and pressure welding terminals, each including a base plate, an electrical contact portion formed at one end of the base plate and a pressure welding piece with a slot upstanding at an opposite end of the base plate, and wherein the pressure welding terminals are placed in the respective terminal placement grooves, with their pressure welding pieces forced through the throughholes, and the wires are pressure-welded via the respective slots to the pressure welding terminals.

Owing to the construction as mentioned above, the second connector can be easily formed by fixing the pressure welding terminals in position on the foremost support plate and press-fitting the wires into the slots of the respective pressure welding terminals. Besides, the foremost support plate being molded integral with the air duct, an easy and reliable integration between the second connector and the air duct can be attained.

Advantageously, the second connector further comprises a cover which covers pressure-welded portions between the pressure welding pieces and the respective wires.

Preferably, the wiring harness device further comprises a pair of longitudinally spaced flanges provided at a rear end of the foremost support plate, each with a cutout formed at a center thereof for passing that portion of the instrument panel wires extending on the support means, the spaced flanges holding therebetween the wall of the instrument panel defining the connector insertion opening to position the second connector in the mount portion for the electrical component unit.

The above and other objects, features and advantages of this invention will become apparent from the following description and the appended claims, taken in conjunction with the accompanying drawings.

DESCRIPTION OF THE PREFERRED EMBODIMENT

One embodiment of this invention will now be described with reference to the attached drawings.

Figure 1:
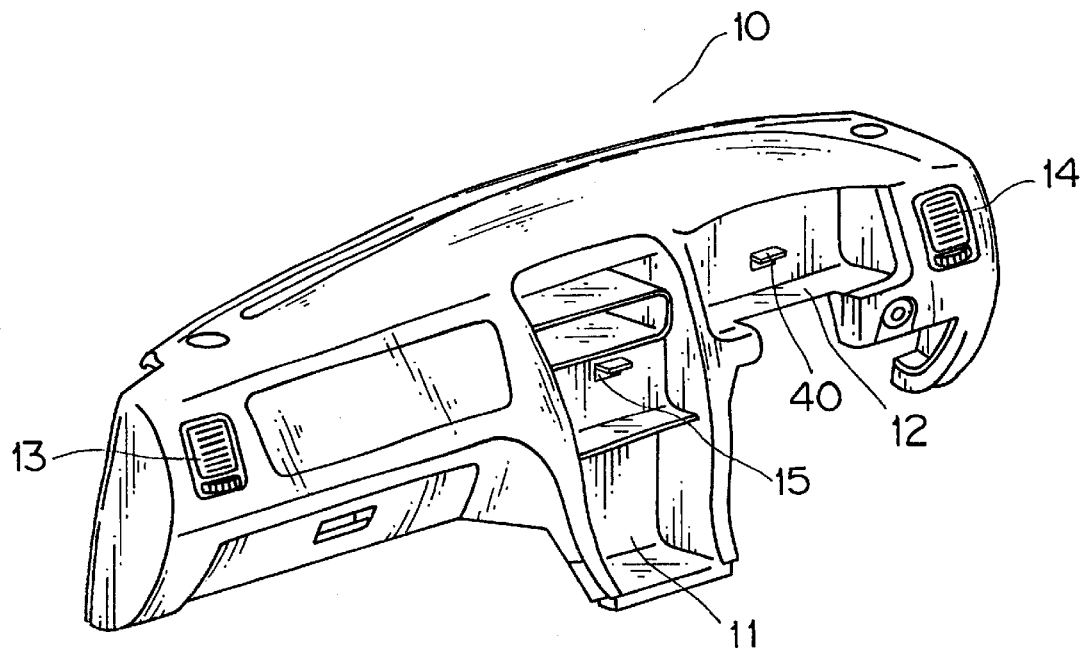
FIG. 1 is a perspective view of an instrument panel to which one embodiment of a wiring harness device according to this invention is applied.

In FIG. 1, denoted 10 is a large molded item of an instrument panel which is provided at the center and the right side with mount portions 11, 12 for not-shown electrical components and at the left and right ends with air outlets 13, 14 for an air conditioner. The innermost wall of each mount portion 11, 12 is provided with an insertion opening 15 at which a later-described unit-awaiting connector 40 of an instrument panel harness 20 is mounted.

Figure 2:
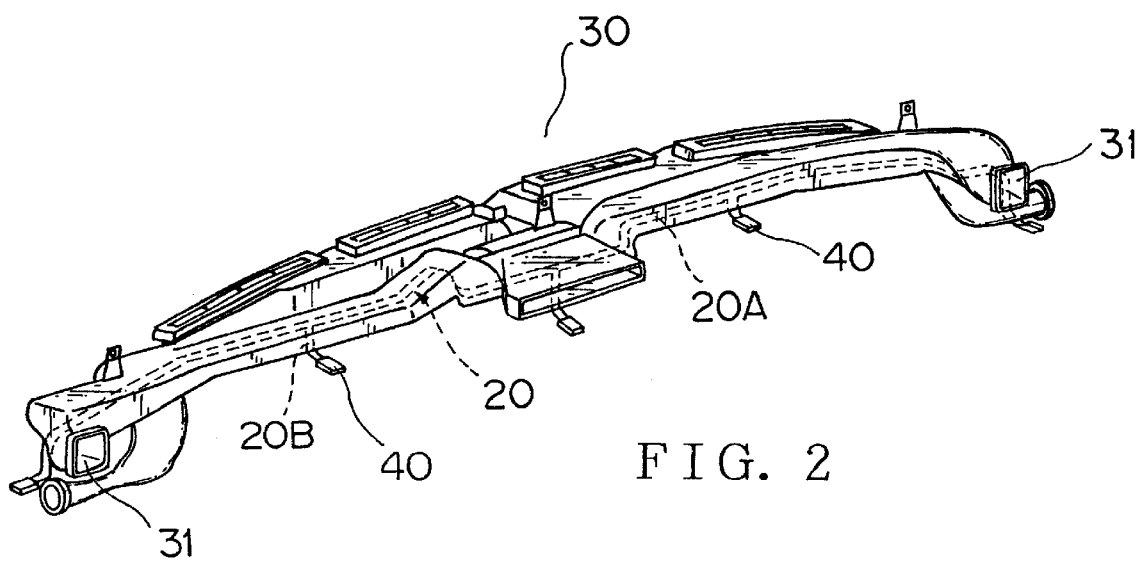
FIG. 2 is a perspective view of an air duct with an instrument panel harness wired thereon, which is assembled to the instrument panel of FIG. 1.
Figure 3:
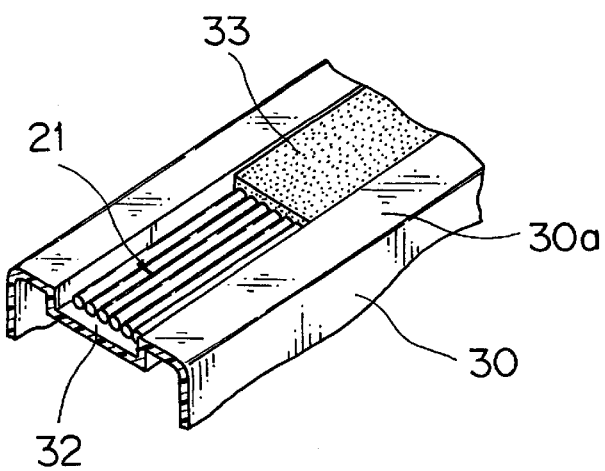
FIG. 3 is a partial enlarged view of the instrument panel harness of FIG. 2 fixed on the air duct.

In FIG. 2, the instrument panel harness 20 includes a trunk portion 20A having a plurality of wires 21 (FIG. 3) gathered in one and branch portions 20B, each having wires 21 tied together and branched from the trunk portion 20A. The branch portion 20B is provided at the end with the unit-awaiting connector 40 as mentioned above.

An air duct 30, like the instrument panel 10, is a large resin molded item and integrally molded by injection molding with a slide core. The air duct 30 is made at the center and the right side to correspond to the respective mount portions 11, 12 for the electrical component unit (not shown), provided on the instrument panel 10 and has a rectangular hood 31 at both ends which connects to the respective air outlet 13, 14.

Figure 4:
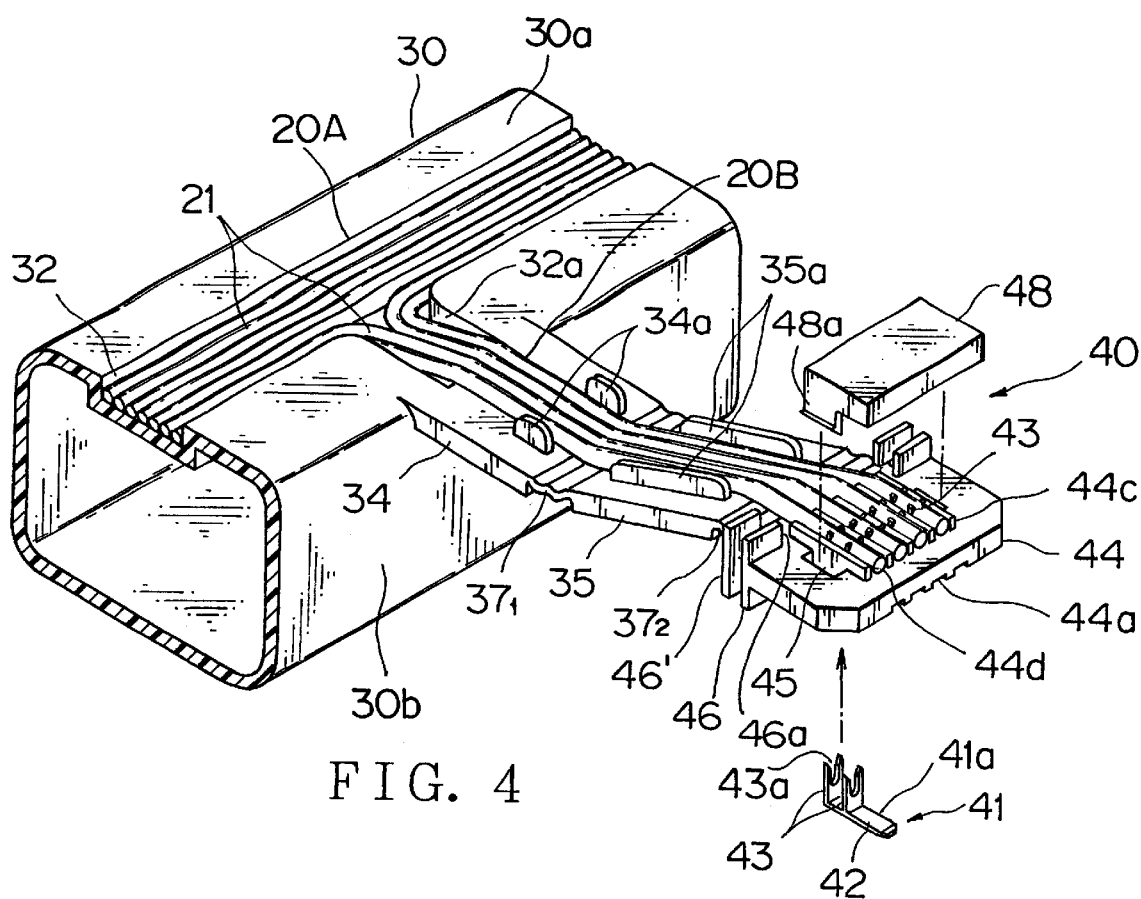
FIG. 4 is a partial enlarged view, taken from below, of a branch portion of the instrument panel harness of FIG. 2, with a unit-awaiting connector shown exploded.

On the underside 30a (FIGS. 3, 4) of the air duct 30 are formed a harness placement groove 32 for the trunk portion 20A of the instrument panel harness 20 and branch grooves 32a for the respective branch portions 20B, the branch grooves 32a being contiguous to the harness placement groove 32 at intermediate portions and both ends of the latter and extending toward the front (30b) of the air duct 30 (FIG. 4).

The plurality of wires 21 are automatically laid in the harness placement groove 32 and its branch grooves 32a by using, for example, a X-Y axis travelling wiring head (not shown, refer to Japanese Patent Specification No. 2505924). A corrugated locking device 33 (FIG. 3) is fitted in the harness placement groove 32 from above to fix the wires 21 and thus the instrument panel harness 20 in the groove 32.

As shown in FIG. 4, the instrument panel harness branch portion 20B laid in the branch groove 32a extends on a series of support plates 34, 35 and 44, which are formed integrally with the air duct 30, to the unit-awaiting connector 40 provided on the foremost support plate (terminal fixing plate) 44.

More specifically, the first support plate 34 projects at the front side 30b of the air duct 30 and is contiguous to the branch groove 32a, and the second support plate 35 is linked at one end, through a hinge 37₁, to the front end of the first support plate 35 and at the other end, through a hinge 37₂, to the third support plate or terminal fixing plate 44 constituting the unit-awaiting connector 40. The first and second support plates 34 and 35 are provided on their upper surfaces with respective pairs of opposed wire guide pieces 34a, 34a and 35a, 35a. Preferably, the hinges 37₁, 37₂ have a sufficiently large dimension, especially length so as to allow the support plates 34, 35 and 44 to be bent, folded or twisted relative to one another.

Thus, the wires 21 of the branch portion 20B laid in the branch groove 32a are guided and extend between the wire guide pieces 34a, 34a and between the wire guide pieces 35a, 35a on the first and second support plates 34, 35 to reach the terminal fixing plate 44, whereat their free ends connect to pressure welding terminals 41 constituting the unit-awaiting connector 40.

In other words, the connector 40 is comprised of the pressure welding terminals 41 to which, as mentioned above, the wire free ends connect, the terminal fixing plate 44 which fixes the pressure welding terminals 41 thereon, and a cover 48.

The pressure welding terminal 41 includes a base plate 41a, a tab-like electrical contact portion 42 formed at one end of the base plate, and a pair of longitudinally spaced pressure welding pieces 43 upstanding at the other end of the base plate, the pressure welding pieces 43 each having a wire press-in slot 43a.

Figure 5:
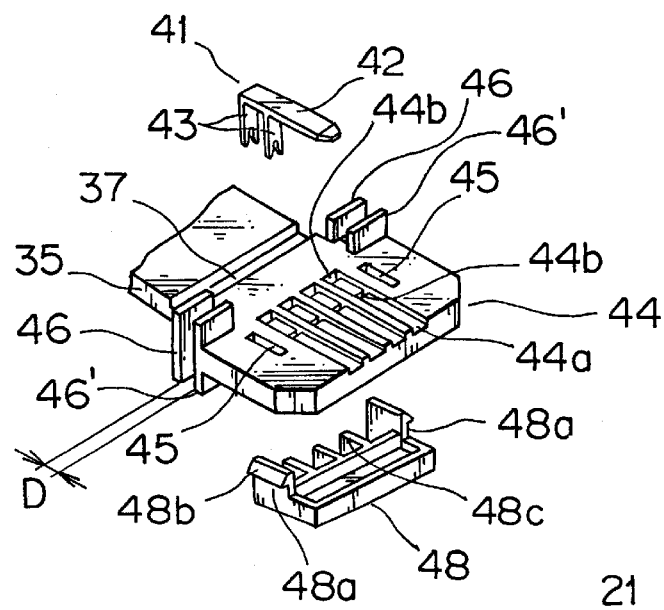
FIG. 5 is a perspective view of the unit-awaiting connector of FIG. 4, with its components shown separated.
Figure 6:
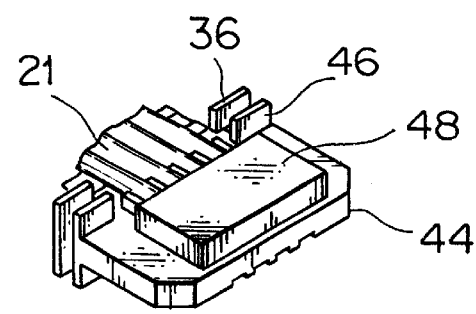
FIG. 6 is a perspective view of the unit-awaiting connector of FIG. 4, shown assembled.

The terminal fixing plate 44, as shown in FIG. 5, has a row of terminal placement grooves 44a formed on its upper surface, each having longitudinally spaced throughholes 44b at the bottom and, as shown in FIG. 4, has a row of wire placement grooves 44d corresponding to the row of terminal placement grooves 44a, partitioned by a partition wall 44c upstanding between neighboring wire placement grooves 44d. Locking holes 45, 45 are provided on opposite sides of the terminal placement grooves 44a, and pairs of longitudinally-spaced vertically extending flanges 46, 46' are provided at the rear end of the terminal fixing plate 44. Each flange 46, 46' has, between outer edges thereof, a width corresponding to a later-described large width portion 16 (FIG. 7) of the insertion opening 15 and has a cutout 46a, 46a' at the center for passing the wires 21. A suitable clearance D is provided between the longitudinally spaced flanges 46 and 46'.

In order to assemble the unit-awaiting connector 40, each pressure welding terminal 41, as shown in FIG. 5, is first fixed in the respective terminal placement groove 44a on the terminal fixing plate 44, with its pressure welding pieces 43 force-fitted into the related throughholes 44b so that their tip ends project to the wire placement groove 44d side.

The free ends of the wires 21 wired with the wiring head, as shown in FIG. 4, are then positioned above the slots 43a of the respective pressure welding terminals 41, followed by individually or by one operation force fitting these ends into the slots 43a with a not-shown pressure welding tool.

Thereafter, the cover 48 is placed on the thus pressure welded wires 21, with resilient locking pieces 48a provided at its opposite sides inserted into the locking holes 45 until their front-end locking claws 48b lockingly engage with the upper surface (FIG. 5) of terminal fixing plate 44, at which time each wire holder 48c formed internally of the cover 48 (FIG. 5) presses on and securely fixes the respective wire 21. The assembly is thus completed.

The relationship between the unit-awaiting connector 40 and the air duct 30 in respects of their mutual spacing and postures can be varied to a great extent.

More specifically, the second and third support plates 35 and 44 are bendable and foldable relative to the first support plate 34 through the interposed hinges 37₁, 37₂. Likewise, the first and second support plates 34 and 35 as well as the second and third support plates 35 and 44 are twistable relative to each other. The first, second and third support plates 34, 35 and 44 can thus be subjected to variations in spacing and posture relative to one another and to the air duct 30, with the result that the unit-awaiting connector 40 integral with the third support plate 44 is likewise subjectable to such variations.

Description will now be made of the assembly of the wiring harness device and the connection between the unit-awaiting connector 40 and the electrical component unit.

Figure 12:
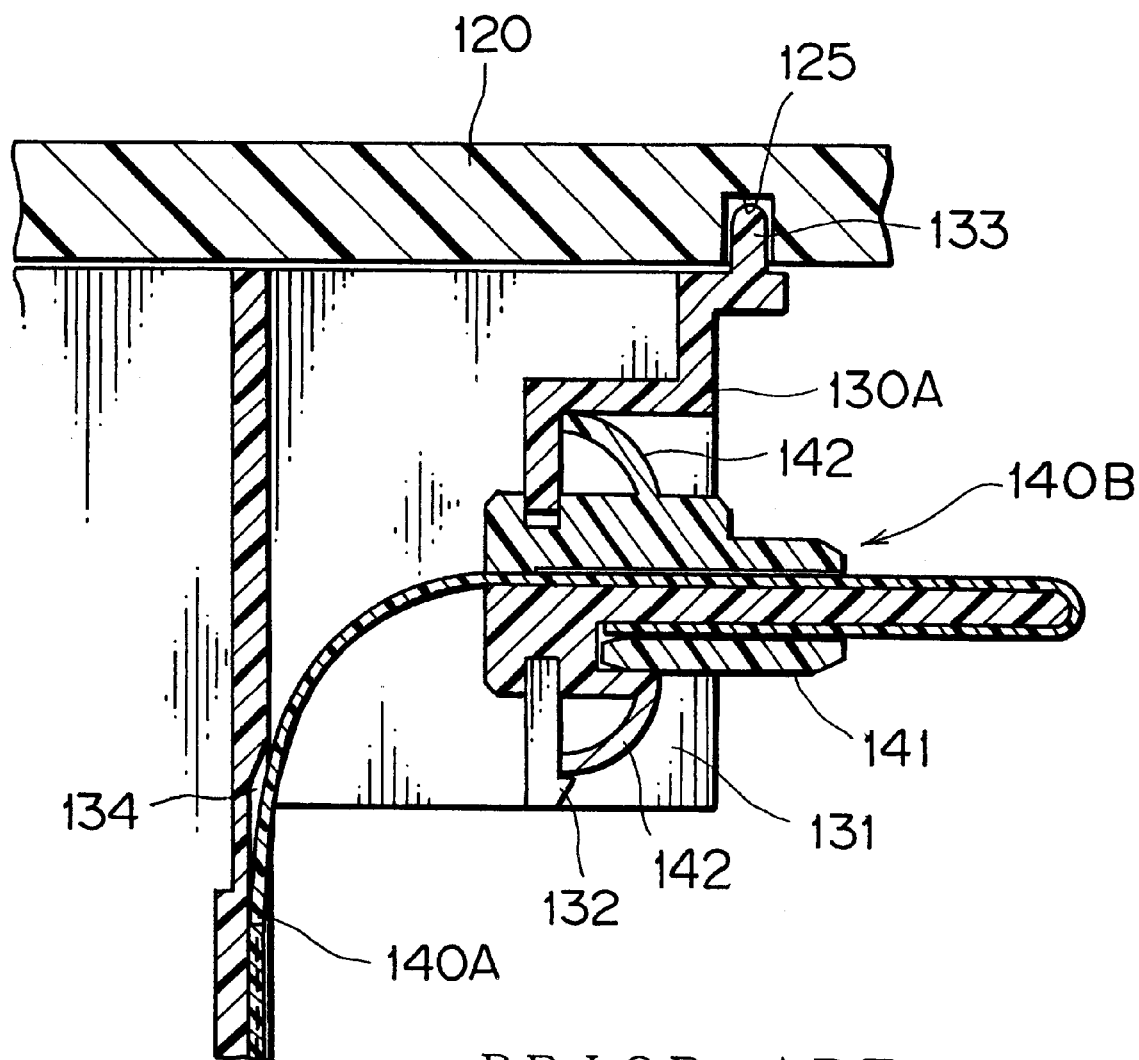
FIG. 12 is a sectional view of a unit-awaiting connector mounted in the connector holder of FIG. 11.

The assembling together of the instrument panel 10 and the air duct 30 with the instrument panel harness 20 wired thereon is done in the same conventional manner as in FIG. 12, and its detailed description will be omitted.

Figure 7:
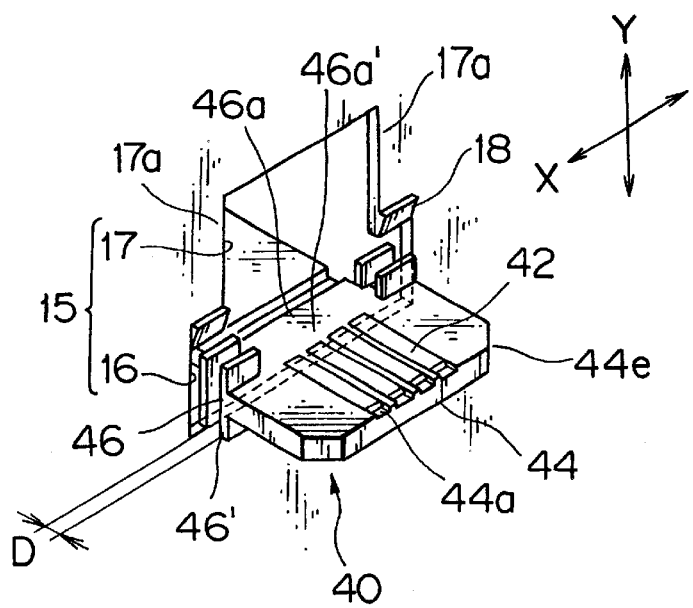
FIG. 7 is a perspective view of the unit-awaiting connector placed in a connector insertion opening provided on the instrument panel of FIG. 1.

Prior to fixing the air duct 30 to the instrument panel 10, the unit-awaiting connector 40, as shown in FIG. 7, is temporarily extracted through the insertion opening 15 provided in the inner wall of the mount portion 11, 12 of the instrument panel 10 into the mount portion, i.e., to the front side where the electrical component unit is mounted.

In other words, the insertion opening 15 consists of a lower large width portion 16 and an upper small width portion 17 contiguous to each other. The large width portion 16 has a size slightly larger than that of the flange 46, 46' of the unit-awaiting connector 40. The connector 40 is passed through the lower large width portion 16 to the front side.

Incidentally, the small width portion 17 has a width smaller than that between the outer edges of the flange 46, 46' so that the side edges 17a defining the small width portion 17 may enter the clearance D between the flanges 46 and 46'. The side edges 17a are provided at their lower ends with a wedge-like detent that becomes thinner toward the lower tip end.

Then, after the instrument panel 10 and the air duct 30 are fixed together, the unit-awaiting connector 40 is moved back to the insertion opening 15 and mounted in the upper small width portion 17. In other words, the clearance D between the flanges 46 and 46' is registered with the side edges 17a defining the small width portion 17, followed by pushing the connector 40 and thus the flanges 46 and 46' upwardly against the detents 18 until the flanges 46 and 46' ride over the detents 18, hold the side edges 17a therebetween and are locked by the detents 18. As will be apparent from FIG. 7, the unit-awaiting connector 40, when mounted in the small width portion 17, is, due to the flanges 46 and 46' that hold the side edges 17a therebetween, movable in horizontal and vertical directions as indicated by arrows X and Y within the small width portion 17, with the electrical contact pieces 42 of the pressure welding terminals 41 exposed on its upper surface.

Figure 8:
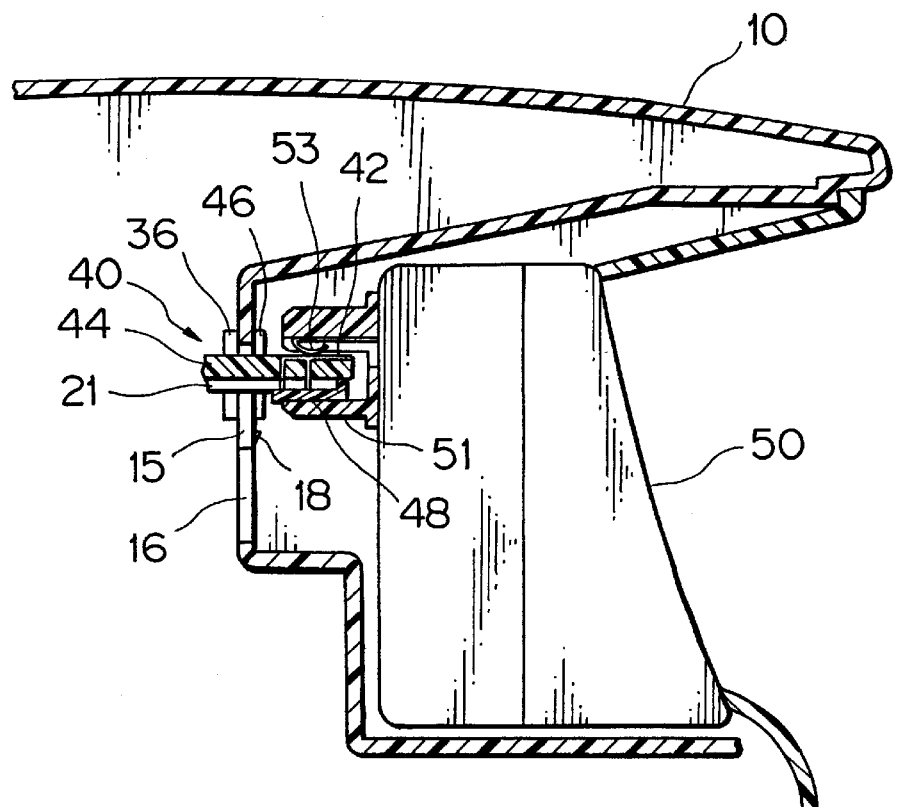
FIG. 8 is a sectional view of the instrument panel of FIG. 1, with the electrical component unit assembled and connected.
Figure 10:
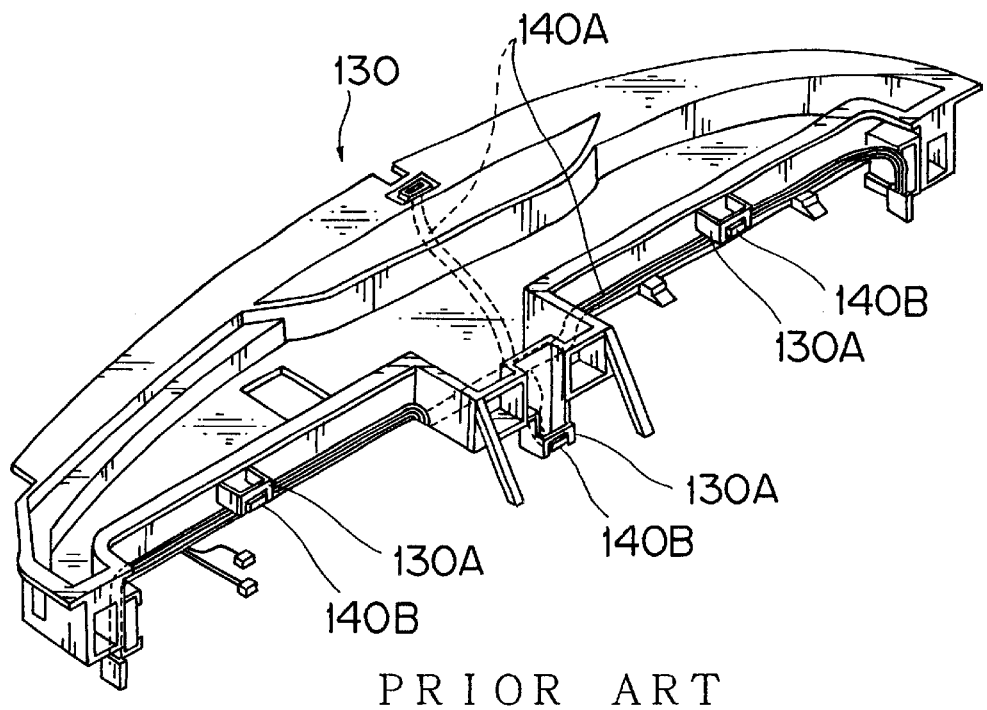
FIG. 10 is a perspective view of an air duct and an instrument panel harness wired on the air duct, both as in FIG.
Figure 9:
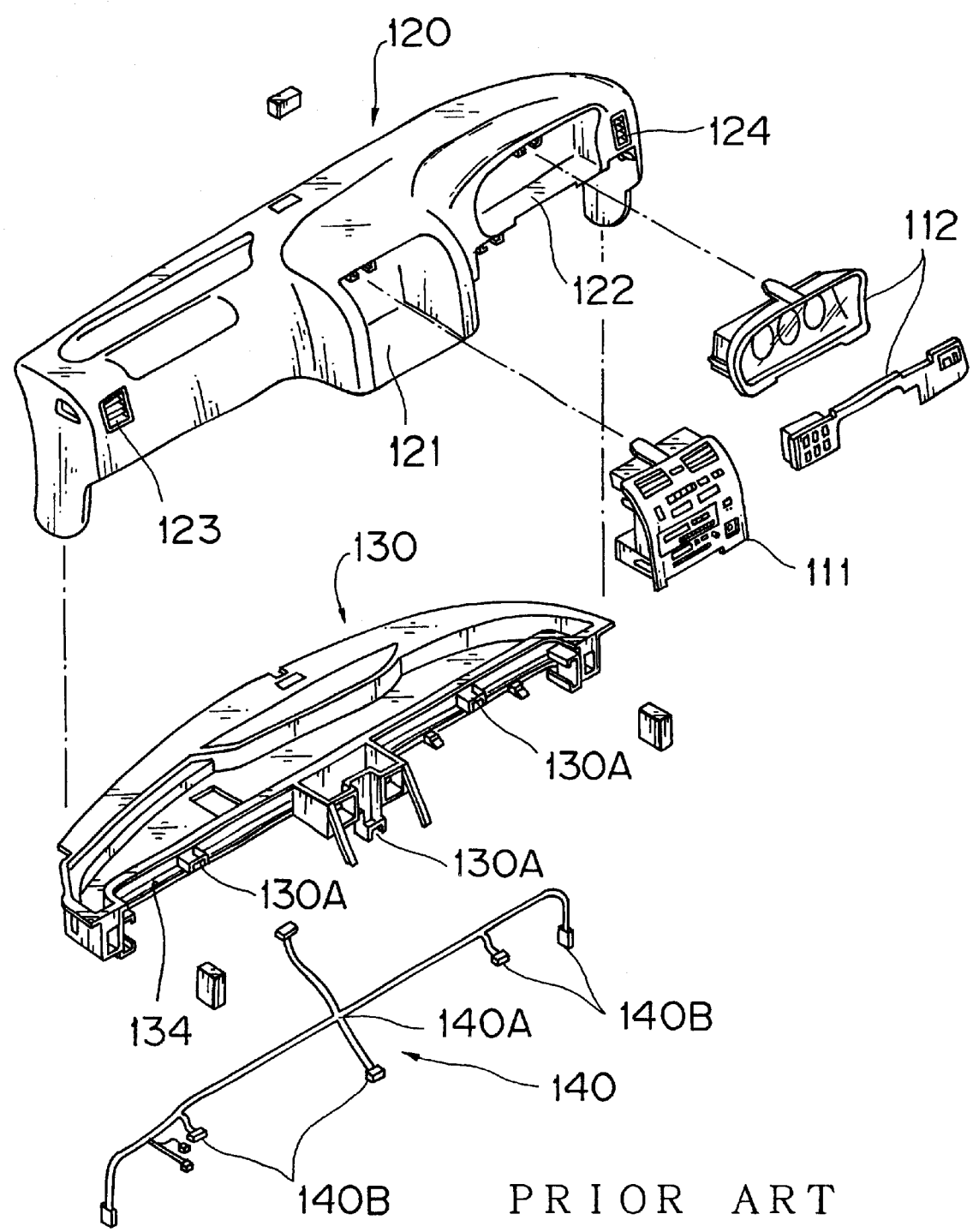
FIG. 9 is an exploded perspective view of a wiring harness device for instrument panels proposed earlier by the present applicant.
Figure 11:
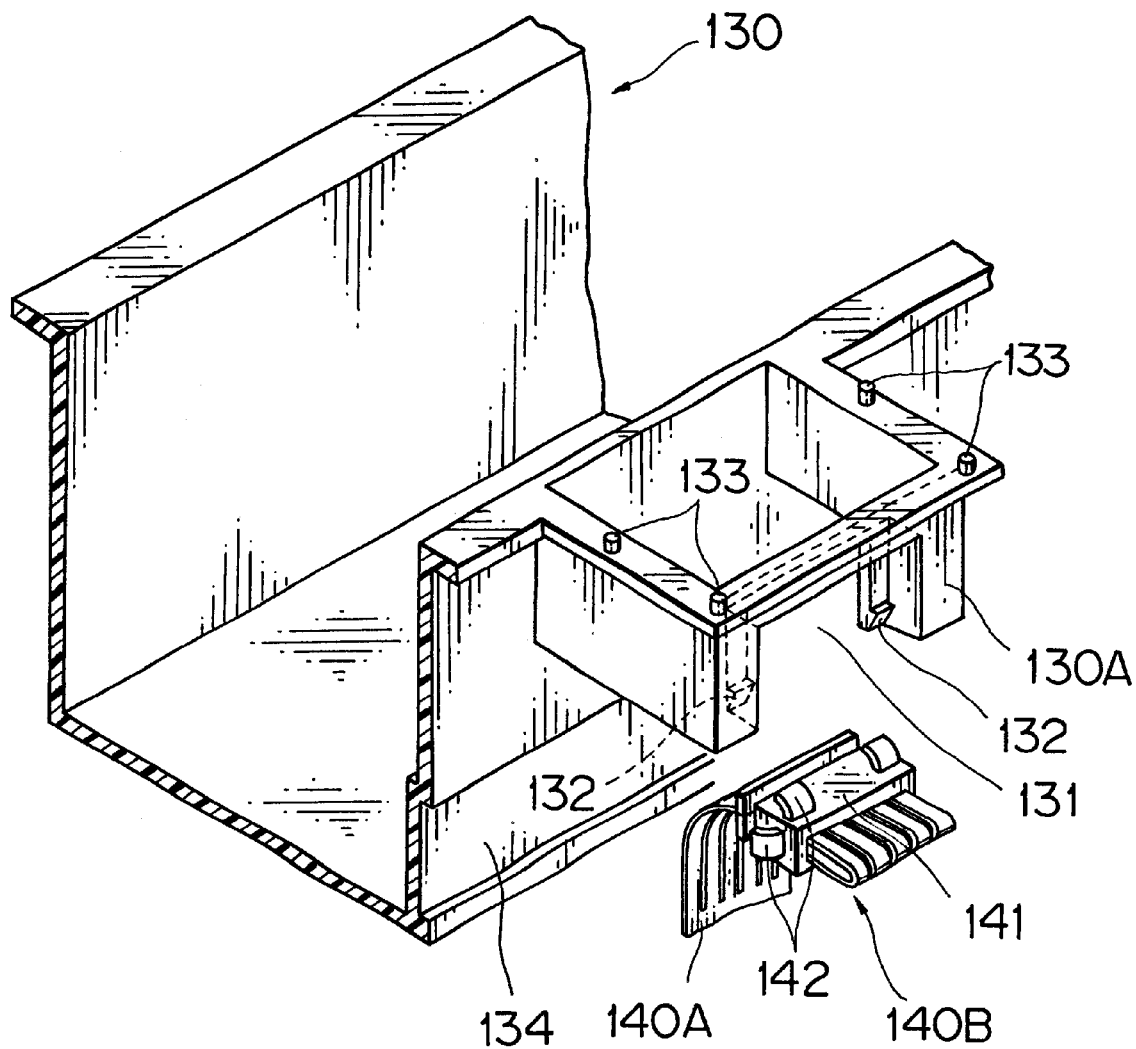
FIG. 11 is an enlarged view of a connector holder provided on the air duct of FIG. 10.

Thereafter, as shown in FIG. 8, if the electrical component unit 50 is inserted into the mount portion 11, 12 of the instrument panel 10, the unit-awaiting connector 40 comes into the mating connector, which is of a surface-to-surface contact type, provided on the back of the unit 50, so that the exposed electrical contact pieces 42 contact surface to surface with respective resilient terminal tongues 53 provided inside the mating connector 51 to make an electrical connection between the connectors 40 and 51.

Because the third support plate (terminal fixing plate) 44 has inserting chamfers 44e at both sides of its front end, the unit-awaiting connector 40 comes smoothly into the mating connector 51 during its coupling with the latter. Further, because the unit-awaiting connector 40 is mounted in the small width portion 17 of the insertion opening 15 to be movable in the directions of the arrows X and Y, it can follow the mating connector 51, if the latter is displaced, to be easily fitted therein.

While the above description concerns an example in which the instrument panel harness 20 consists of normal insulatingly covered wires 21 laid automatically in the harness placement groove 32 with the wiring head and fixed therein with the locking device 33 (FIG. 3), it is also possible to employ, for example, a separate wiring harness, flat wiring harness or resilient printed circuit board of a wires-gathered type prepared in advance in agreement with the harness placement groove 32 and its branch grooves 32. It is also possible to fix the harness in the harness placement groove 32 with an adhesive or integrally in the air duct 30 by insert molding.

While in the above example, the unit-awaiting connector 40 is shown to be of a surface contact type having pressure welding terminals 41 for that purpose, it is also possible to employ a connector of a normal insertion type which adopts male or female terminals. In that case, a housing (not shown) will be employed in place of the terminal fixing plate 44, which housing has terminal receiving cavities formed therein for the male or female terminals.

Further, instead of providing the terminal fixing plate 44 integrally with the second support plate 35, it is also possible to make a separation at between the flanges 46 and 46' and screw the thus separated parts to each other with a spacer interposed therebetween for maintaining the clearance D.

Having now fully described the invention, it will be apparent to one of ordinary skill in the art that many changes and modifications can be made thereto without departing from the spirit and scope of this invention as set forth herein.

What is claimed is:

1. A wiring harness device for instrument panels comprising:
   an electrical component unit having a first connector;
   an instrument panel having a mount portion for said electrical component unit and a connector insertion opening formed in a wall thereof defining said mount portion through which a second connector mates with said first connector;
   an air duct having a wall containing a wire placement groove on a surface thereof, which is assembled to said instrument panel; and
   instrument panel wires fixedly laid in said wire placement groove on said air duct,
   wherein said air duct has a support means which carries said second connector with said second connectorbeing formed on a front end of said support means, and said instrument panel wires have a portion extending on said support means to said second connector, said support means extending from said wall of said air duct in a flexible cantilever manner such that said second connector is movable relative to said air duct and easily mountable in said connector insertion opening for mating with said first connector when said electrical component unit is received in said mount portion of said instrument panel.

2. The wiring harness device according to claim 1, wherein said support means comprises a plurality of support plates flexibly linked end-to-end to one another, and said second connector is located on a foremost one of said support plates.

3. The wiring harness device according to claim 1, wherein said support means comprises a first support plate projecting integrally from said wall of said air duct, a second support plate linked end-to-end through a hinge to said first support plate, and a third support plate linked end-to-end through a hinge to said second support plate, and said second connector is located on said third support plate.

4. The wiring harness device according to claim 1, wherein said instrument panel wires are fixed in said wire placement groove on said air duct by means of a locking device fitted in said wire placement groove.

5. The wiring harness device according to claim 4, wherein said locking device has corrugations which fit on said instrument panel wires laid in said wire placement groove.

6. The wiring harness device according to claim 1, wherein said wire placement groove formed on said air duct has a branch groove extending perpendicularly therefrom to guide said portion of said instrument panel wires to said support means.

7. The wiring harness device according to claim 2, wherein said second connector comprises said foremost support plate, a row of terminal placement grooves formed on one surface of said foremost support plate, each of said grooves being provided with a throughhole on a bottom thereof which communicates to an opposite surface of said foremost support plate, and pressure welding terminals, each including a base plate, an electrical contact portion formed at one end of said base plate and a pressure welding piece with a slot upstanding at an opposite end of said base plate, and wherein said pressure welding terminals are placed in said respective terminal placement grooves, with their said pressure welding pieces forced through said throughholes, and said wires are pressurewelded welded via said respective shots to said pressure welding terminals.

8. The wiring harness device according to claim 7, wherein said second connector further comprises a cover which covers pressure-welded portions between said pressure welding pieces and said respective wires.

9. The wiring harness device according to claim 2, further comprising a pair of longitudinally spaced flanges provided at a rear end of said foremost support plate, each with a cutout formed at a center thereof for passing said portion of said instrument panel wires, said spaced flanges holding said wall of said instrument panel therebetween to position said second connector in said mount portion for said electrical component unit.

\* \* \* \* \*